US012720055B2

(12) United States Patent
Racape et al.

(10) Patent No.: US 12,720,055 B2
(45) Date of Patent: Aug. 25, 2026

(54) SYSTEMS AND METHODS FOR ENCODING A DEEP NEURAL NETWORK

(71) Applicant: InterDigital Patent Holdings, Inc., Wilmington, DE (US)

(72) Inventors: Fabien Racape, San Francisco, CA (US); Shahab Hamidi-Rad, Sunnyvale, CA (US); Swayambhoo Jain, Milpitas, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 164 days.

(21) Appl. No.: 17/794,117

(22) PCT Filed: Jan. 22, 2021

(86) PCT No.: PCT/US2021/014686

§ 371 (c)(1),
(2) Date: Jul. 20, 2022

(87) PCT Pub. No.: WO2021/158378

PCT Pub. Date: Aug. 12, 2021

(65) Prior Publication Data

US 2023/0064234 A1 Mar. 2, 2023

Related U.S. Application Data

(60) Provisional application No. 62/970,880, filed on Feb. 6, 2020.

(51) Int. Cl.
*H04N 19/134* (2014.01)
*H04N 19/124* (2014.01)
*H04N 19/13* (2014.01)
*H04N 19/46* (2014.01)
*H04N 19/94* (2014.01)

(52) U.S. Cl.
CPC ........... *H04N 19/124* (2014.11); *H04N 19/13* (2014.11); *H04N 19/46* (2014.11); *H04N 19/94* (2014.11)

(58) Field of Classification Search
CPC ...... H04N 19/124; H04N 19/13; H04N 19/46; H04N 19/94
See application file for complete search history.

(56) References Cited

U.S. PATENT DOCUMENTS

2005/0036699 A1 2/2005 Holcomb et al.
2005/0249291 A1* 11/2005 Gordon ................ H04N 19/176 375/240.18
2009/0190843 A1* 7/2009 Jung ...................... H04N 19/43 382/233
2012/0287994 A1* 11/2012 Van Der Auwera ......................... H04N 19/176 375/E7.243

(Continued)

OTHER PUBLICATIONS

ISO/IEC JTC1/SC29/WG11; "[NNR] On high-level bitstream syntax for compressed neural network representation" Nokia, MPEG2019/m51611; Jan. 2020, Brussels, Belgium, 6 pages.

(Continued)

*Primary Examiner* — Jonathan R Messmore
(74) *Attorney, Agent, or Firm* — Flaster Greenberg P.C.

(57) ABSTRACT

The disclosure relates to a method for compression including codebook-based quantization of a data set and corresponding decompression method, signal; bitstream, and encoder and/or decoder device.

20 Claims, 7 Drawing Sheets

(56) References Cited

U.S. PATENT DOCUMENTS

| | | | | |
|---|---|---|---|---|
| 2013/0182755 | A1* | 7/2013 | Chen | H04N 19/70 375/240.01 |
| 2015/0365703 | A1* | 12/2015 | Puri | H04N 19/46 375/240.24 |
| 2018/0006791 | A1* | 1/2018 | Marinier | H04L 1/0061 |
| 2019/0340214 | A1* | 11/2019 | Gudovskiy | G06N 3/04 |

OTHER PUBLICATIONS

ISO/IEC JTC1/SC29/WG11; "Description of Core Experiments on Compression of neural networks for multimedia content description and analysis", Video Subgroup, N18574, Jul. 2019, Gothenburg, SE, 20 pages.

ISO/IEC JTC1/SC29/WG11; "[NNR] Conditional arithmetic coding for quantized parameters", InterDigital Communications, Inc., MPEG2019/m51018, Oct. 2019, Geneva, Switzerland, 6 pages.

ISO/IEC JTC1/SC29/WG11; "Working Draft 2 of Compression of neural networks for multimedia content description and analysis", Video Subgroup, N18784, Oct. 2019, Geneva, CH, 26 pages.

N18992—Working Draft 3 of Compression of neural networks for multimedia content description and analysis. International Organization for Standardization ISO/IEC JTC1/SC29/WG11, janv-2020.

S. Wiedemann, K.-R. Müller, et W. Samek, « Compact and computationally efficient representation of deep neural networks », IEEE transactions on neural networks and learning systems, 2019.

Infrastructure of audiovisual services—Coding of moving video—High Efficiency Video Coding, International Telecommunications Union (ITU), ITU-T Telecommunication Standardization Sector of ITU, Series H: Audiovisual and Multimedia Systems, Recommendation ITU-T H.265, Oct. 2014, 540 pages.

* cited by examiner

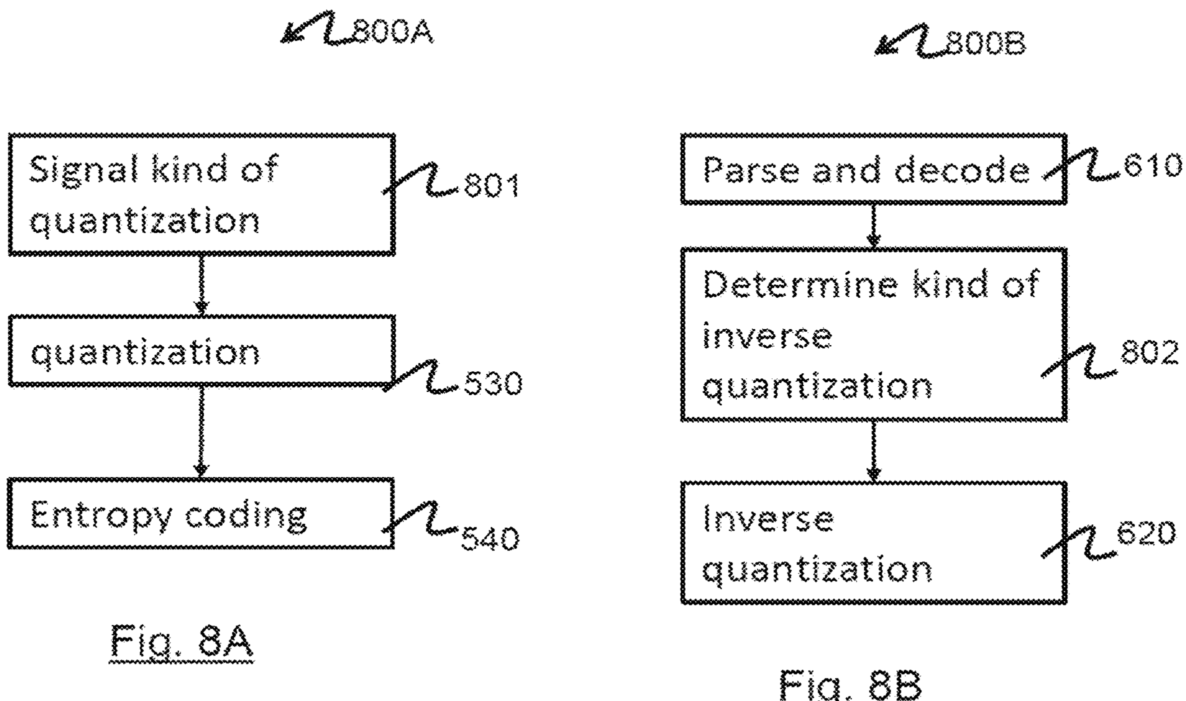
Fig. 8A
Fig. 8B
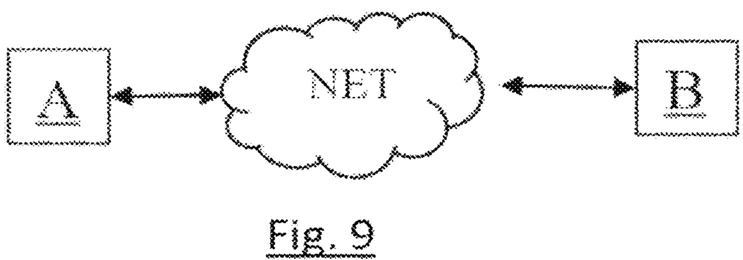
Fig. 9
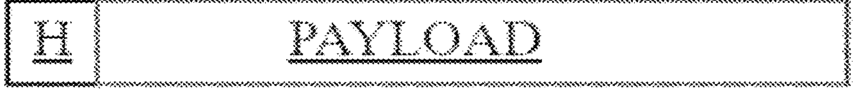
Fig. 10

SYSTEMS AND METHODS FOR ENCODING A DEEP NEURAL NETWORK

CROSS-REFERENCE TO RELATED APPLICATIONS

This application is the 371 National Stage of International Application No. PCT/US2021/014686, filed Jan. 22, 2021, which claims priority to U.S. Provisional Application No. 62/970,880, filed Feb. 6, 2020, the disclosures of which are incorporated herein by reference in their entireties.

INTRODUCTION

The domain technical field of the one or more embodiments of the present disclosure is related to the technical domain of data processing, like for data compression and/or decompression. For instance, at least some embodiments relate to data compression/decompression involving large volume of data, like compression and/or decompression of at least a part of an audio and/or video stream, or like compression and/or decompression of data in link with Deep Learning techniques, like at least some parameters of a Deep Neural Network (DNN).

At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such WC (Versatile Video Coding, a new standard being developed by JVET, the Joint Video Experts Team).

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

At least some embodiments relate to improving compression efficiency compared to existing systems for compressing a Deep Neural Network (DNN), such as some compression standard or draft standard like the current upcoming standard ISO/MPEG7 of neural networks for multimedia content description and analysis currently developed by the International Organization for Standardization.

Generally, in an encoding process, parameters of a DNN are quantized and entropy coded to obtain compressed data. To reconstruct data, the compressed data are decoded, the decoding processes including entropy decoding and inverse quantization.

DESCRIPTION

The present principles enable at least one of disadvantages of some known compression and/or decompression methods to be resolved by proposing a method comprising compressing data in at least one bitstream, data being for instance video data or one or more weights, also called parameters in the following, of at least one tensor of at least one layer or sub-layer of at least one Deep Neural Network.

According to a first aspect, said compressing can comprise encoding in said bitstream at least one information representative of a kind of quantization performed on said data.

According to some embodiments of the present disclosure, said method is adapted to compress video data.

According to some embodiments of the present disclosure, said method is adapted to compress at least one weight of at least one tensor of at least layer or sub-layer of at least one Deep Neural Network.

The representative information can permit to make a distinguish for instance between quantization of different kinds, including Uniform quantization and Codebook-based quantization.

According to some embodiments of the present disclosure, said representative information is adapted to indicate a use of a uniform quantization and/or a codebook-based quantization. According to a second aspect, according to some embodiments of the present disclosure, said compressing can further comprise encoding in said bitstream at least one information representative of a codebook used for quantizing said data during said compressing.

According to a third aspect, the present principles enable at least one of disadvantages of some known compression and/or decompression methods to be resolved by proposing a method comprising encoding quantized data in a bitstream according to at least one kind of quantization, said encoding comprising binarizing said quantized data, wherein a sign flag is conditionally encoded during said binarizing based on said kind of quantization.

According to a variant, the present principles enable at least one of disadvantages of some known compression and/or decompression methods to be resolved by proposing a method comprising encoding quantized data in a bitstream, wherein said encoding comprises binarizing said quantized data, wherein when quantized data are based on a codebook, no sign flag is encoded during said binarizing.

According to a fourth aspect, the present principles enable at least one of disadvantages of some known compression and/or decompression methods to be resolved by proposing a method comprising quantizing a data set by coding index values associated to said data set according to a codebook, said index values being coded as signed integers and said coded index values including at least one negative integer and at least one positive integer.

According to at least some embodiments of the present disclosure, the set of coded index values of said data set is centered around 0.

According to at least some embodiments of the present disclosure, said codebook is obtained by clustering said dataset and is sorted according to the size of clusters resulting from said clustering; and wherein one of two successive values of indexes of said sorted codebook is coded as a first positive integer and the other one of said two successive values of indexes of said sorted codebook is coded as a first negative integer.

According to at least some embodiments of the present disclosure, said first positive integer and said first negative integer have the same absolute value.

According to at least some embodiments of the present disclosure, said codebook is obtained by clustering said dataset and is sorted according to the size of clusters resulting from said clustering; and wherein the absolute value of a first coded index value that corresponds to a first cluster of said codebook is greater or equal to the absolute value of a second coded index value that corresponds to a second cluster of said codebook when the size of the first cluster is smaller than the size of the second cluster.

According to at least some embodiments of the present disclosure, said codebook is sorted decreasingly.

According to at least some embodiments of the present disclosure, said method comprises encoding said sorted codebook in said bitstream.

According to at least some embodiments of the present disclosure, said method comprises reordering said sorted codebook before said encoding.

The present disclosure also proposes a method comprising decompressing a bitstream, for instance a bitstream representative of video data or representative of one or more parameters of at least one tensor of at least one layer or sub-layer of at least one Deep Neural Network.

According to a first aspect, said decompressing can comprise extracting quantized form of data from said bitstream and decoding in said bitstream at least one information representative of a kind of quantization performed on said data.

According to some embodiments of the present disclosure, said method is adapted to decompress a bitstream representative of video data.

According to some embodiments of the present disclosure, said method is adapted to decompress a bitstream representative of at least one weight of at least one tensor of at least layer or sub-layer of at least one Deep Neural Network.

The representative information can permit to make a distinguish for instance between quantization of different kinds, including Uniform quantization and Codebook-based quantization.

According to some embodiments of the present disclosure, said representative information is adapted to indicate a use of a uniform quantization and/or a codebook-based quantization on said quantized form of data.

According to a second aspect, according to some embodiments of the present disclosure, said decompressing can further comprise decoding in said bitstream at least one information representative of a codebook used for quantizing said data.

According to a third aspect, according to some embodiments of the present disclosure, the present principles enable at least one of disadvantages of some known compression and/or decompression methods to be resolved by proposing a method comprising decoding said bitstream to extract quantized form of data, said decoding taking account of a sign flag conditionally encoded in said bitstream based on a kind of quantization performed on said data.

According to some embodiments of the present disclosure, the present principles enable at least one of disadvantages of some known compression and/or decompression methods to be resolved by proposing a method comprising decoding a bitstream to extract quantized form of data, wherein when quantized data are based on a codebook, no sign flag is decoded.

According to a fourth aspect, according to some embodiments of the present disclosure, the present principles enable at least one of disadvantages of some known compression and/or decompression methods to be resolved by proposing a method comprising performing inverse quantizing from codebook-based quantized form of data extracted from said bitstream by decoding index values associated to said data according to a codebook, said index values being coded as signed integers and said coded index values including at least one negative integer and at least one positive integer.

According to at least some embodiments of the present disclosure, said method comprises decoding and/or reordering said codebook.

According to another aspect, there is provided an apparatus. The apparatus comprises a processor. The processor can be configured to compress a video stream and/or one or more parameters of at least one tensor of at least one layer of at least one Deep Neural Network in at least one bitstream, and/or to decompress a bitstream representative of a video stream and/or one or more parameters of at least one tensor of at least one layer of at least one Deep Neural Network, by executing any of the aforementioned methods.

According to another general, aspect of at least one embodiment, there is provided a device comprising an apparatus according to any of the decoding embodiments; and at least one of (i) an antenna configured to receive a signal, the signal including the input data, (ii) a band limiter configured to limit the received signal to a band of frequencies that includes the input data, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising a video data and/or data representative of one or more parameters of at least one tensor of at least one layer or sub-layer of at least one Deep Neural Network, generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

BRIEF DESCRIPTION OF THE DRAWINGS

FIG. 8A illustrates an exemplary method for encoding data into a bitstream, according to an embodiment.

FIG. 8B illustrates an exemplary method for decoding data from a bitstream, according to an embodiment.

FIG. 9 shows two remote devices communicating over a communication network in accordance with an example of present principles.

FIG. 10 shows the syntax of a signal in accordance with an example of present principles.

DETAILED DESCRIPTION

Figure 1:
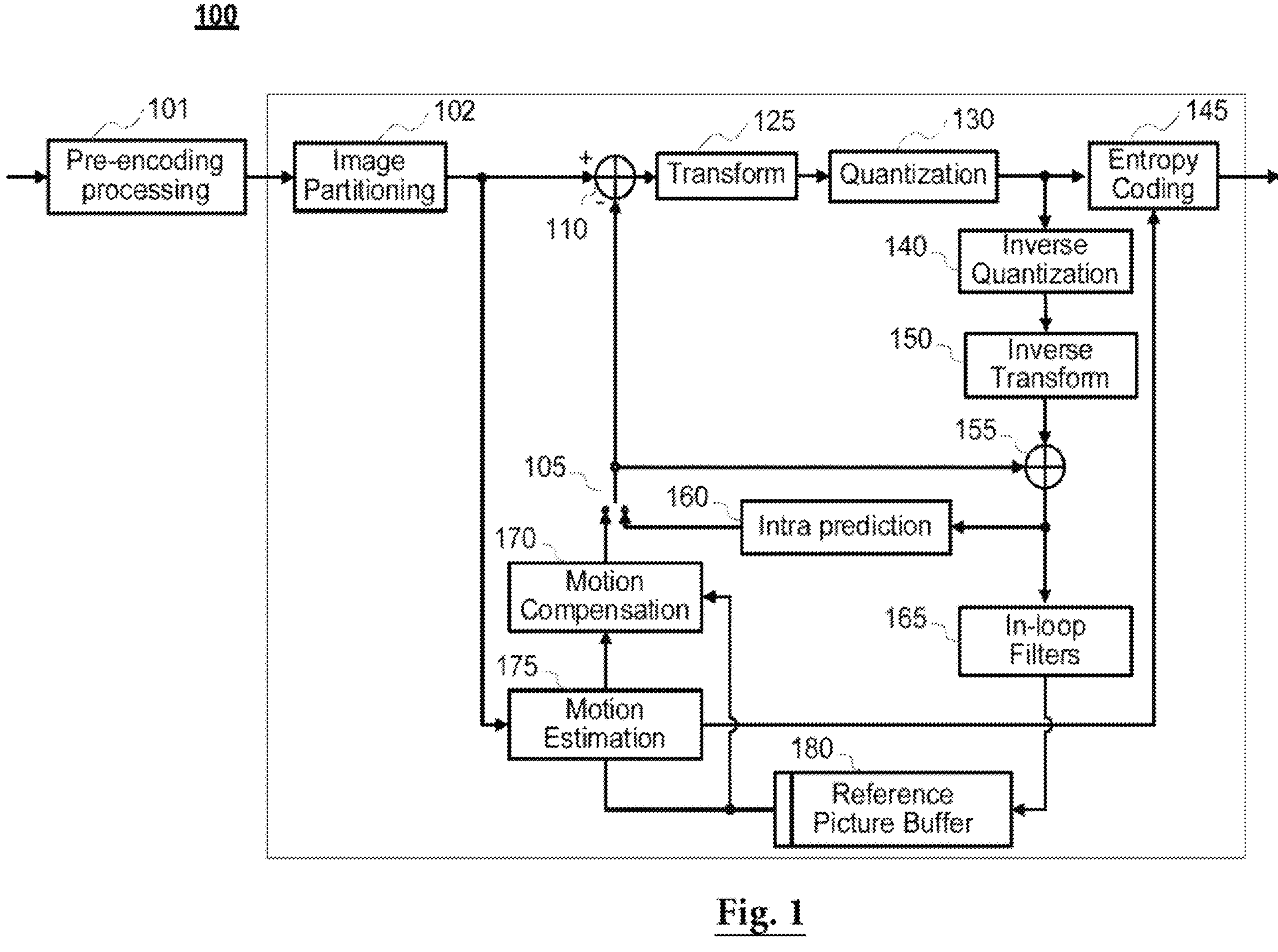
FIG. 1 shows a generic, standard encoding scheme.

Many technical fields can involve the processing, with computer means, of large volume of data. Such processing can involve data compression and/or decompression of data, for a purpose a storage or of transmission of at least a part of such data for instance. Examples of compression and/or decompression of streams containing large amount of data can be found in the technical field of video processing, or in technical fields involving Deep Learning techniques.

Embodiments of the present disclosure are detailed hereinafter in link with Deep Neural Networks (DNNs) as an exemplary and not limitative purpose. It is clear however that the present disclosure can also apply to the compression/decompression of other large amount of data, like in the technical field of video processing. For instance, the present disclosure can apply to the compression/decompression of a tensor obtained by a Deep Learning Algorithm from at least one image.

Deep Neural Networks (DNNs) have shown state of the art performance in variety of domains such as multimedia processing, computer vision, speech recognition, natural language processing, etc. This performance however can come at the cost of massive computational cost as DNNs tend to have a huge number of parameters often running into millions, and sometimes even billions.

This can lead for instance to prohibitively high inference complexity. In simple words, inference is the deployment of a DNN, once trained, for processing input data, in view of their classification for instance. Inference complexity can be defined as the computational cost of applying trained DNN to input data for inference. Inference complexity can be defined as the computational cost of applying trained DNN to test data for inference.

This high inference complexity can thus be an important challenge for using DNNs in environments involving an electronic device with limited hardware and/or software resource, for instance mobile or embedded devices with resource limitations like battery size, limited computational power, and memory capacity etc.

Deep Neural Networks are made up of several layers. A layer is associated with a set of parameters that can be obtained for instance during a training of the DNN. These parameters (like Weights and/or Biases) are stored as multidimensional arrays (also referred to herein as "tensors"). In the following, for simplicity purpose, the term matrix can sometimes be used to denote the set of parameters of a given layer. It is to be understood, however, that some embodiments of the methods of the present disclosure can also be applied to tensors of parameters with more than two dimensions, such as 2D convolutional layers which usually contain 4D tensors of parameters. The huge number of parameters of DNNs can require a large bandwidth for deployment of DNNs (or solutions including DNNs) in distributed environments.

At least some embodiments of the present disclosure apply to the compression and/or decompression (decoding) of at least some parameters of at least one DNN (for instance a pre-trained DNN). Indeed, compression can facilitate the transmission and/or storage of the parameters of the at least one DNN. More precisely, at least some embodiments of the present disclosure apply to the compression of parameters of at least one tensor associated with at least one layer of at least one Deep Neural Network.

Depending upon embodiments of the present disclosure, the layers (or sub-layers) can be of different types. For instance, in some embodiments, all the at least one layer can be convolutional layer(s), or fully connecter layer(s), or the at least one layer can comprise at least one convolutional layer and/or at least one fully connecter layer.

Some embodiments of the present disclosure relate more specifically to a quantization and to an inverse quantization of parameters/weights of the tensors included in one or more layer(s) to be compressed of one or more DNNs.

Figures 5, 6:
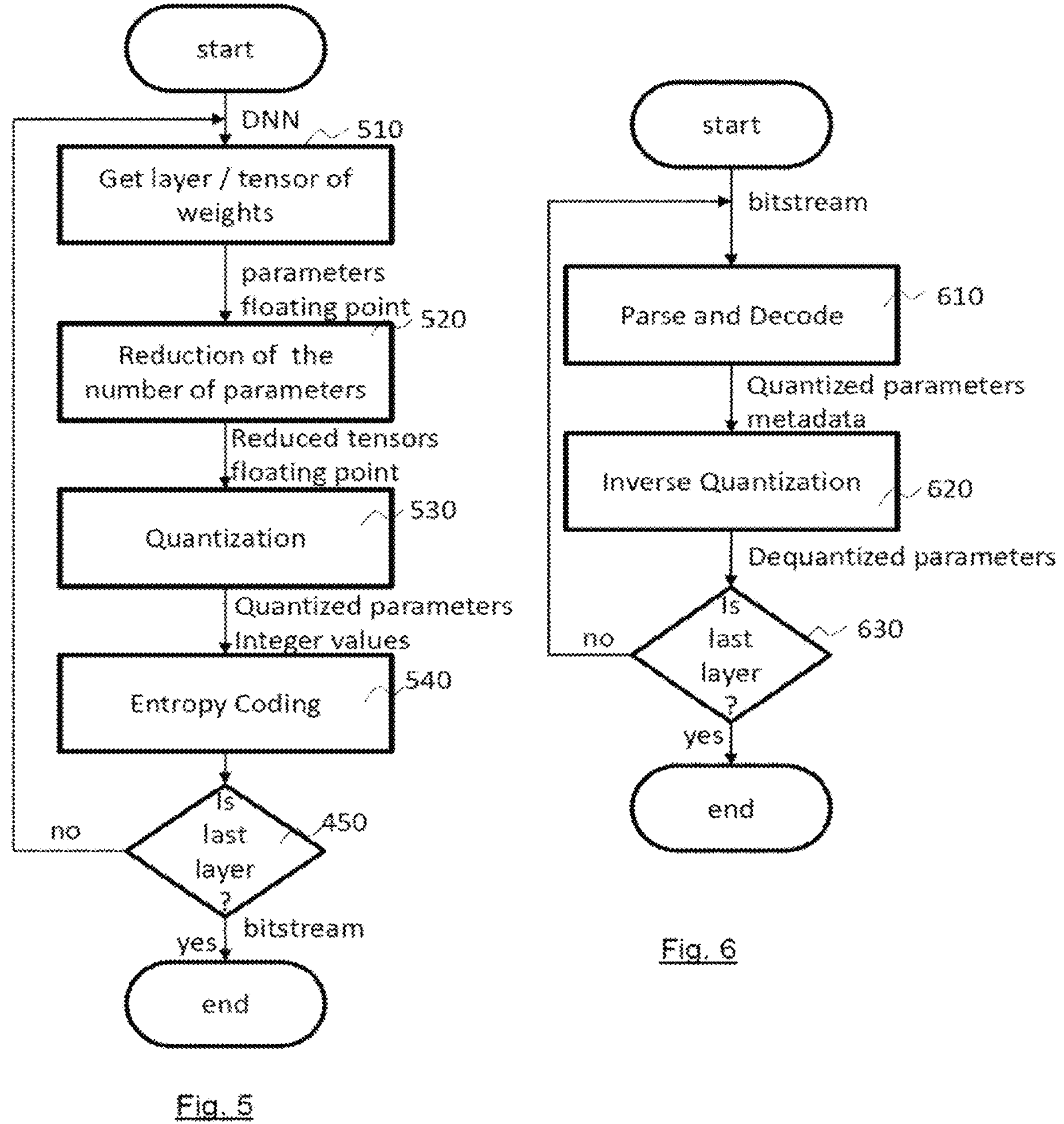
FIG. 5 illustrates a DNN encoding scheme using at least some embodiment of the encoding method of the present disclosure.
FIG. 6 illustrates a DNN decoding scheme using at least some embodiment of the decoding method of the present disclosure.

FIGS. 5 and 6 illustrate respectively at a high level a general process for encoding/decoding parameters of at least one layer of at least one DNN, that can be used in at least some embodiments of the present disclosure.

In the exemplary embodiment of the compression method 500 of FIG. 5, the method 500 can comprise obtaining 510 (or in other words getting) parameters of the tensor associated with a layer to be compressed. The obtaining can for instance be performed by retrieving the parameters of at least one layer from a storage unit, or by receiving the parameters from a data source via a communication interface.

As illustrated by FIG. 5, performing a compression of a layer of a Neural Network can comprise:

Quantization 530 of parameters (like Weights and Biases) of the layer of the Neural Network to represent them with a smaller number of bits;

Lossless entropy coding 540 of the quantized information.

In some embodiments, the compression 500 can further comprise, prior to the quantization 530, a step of reducing 520 the number of parameters (or Weights or Biases) of the Neural Network by utilizing the inherent redundancies in the Neural Network. The reducing 520 thus provides a tensor of reduced dimensions, compared to the dimension of the tensor associated with a layer. For instance, the tensors of parameters of each layer of the DNN can be decomposed or made sparse in the reducing 520.

The resulting tensors, usually made of floating-point values, are quantized and entropy coded to compose the final bitstream, which is transmitted to the receivers.

This reducing 520 is optional, and can thus be omitted in some embodiments.

Depending upon the DNN compression solutions, different kinds of quantization can be performed. Quantization can for instance be performed by using a uniform quantization or a non-uniform quantization like a Codebook-based quantization as in some DNN compression solutions, notably in some compression standard like some upcoming standard ISO/MPEG7 relating to neural networks for multimedia content description and analysis, which is denoted hereinafter more simply MPEG NNR.

A Codebook is a set of values (like integer values or floating-point values) that the parameters of a layer can have, after quantization. Indices can be derived from the codebook values assigned to the parameters of the original tensor (associated with the layer) by the quantizing. Codebook-based quantization will be presented in more detailed hereinafter.

As illustrated by FIG. 5, the parameters input to the quantization can be of floating-point type, while the output of the quantization can comprise one or more tensor of indices of integer type. Optionally, the quantization can also output the codebook to which the indices relate to. Indeed, in some embodiments, for instance in embodiments where the codebook is pre-fixed by the quantization, the codebook can be omitted in the output of the quantization.

According to FIG. 5, at least some of the outputs of the quantization 530 are used as input for performing a lossless entropy coding 540. Other elements (like a shape of the original tensor or symbol counts) can also be input to the entropy coding 540.

When several layers can be encoded by the encoding method 500, after encoding parameters associated to a layer, the method can be performed iteratively layer per layer for a DNN, until (550) the end of the encoding of parameters of the last layer to be encoded.

FIG. 6 depicts a decoding method 600 that can be used for decoding a bitstream obtained by the encoding method 500 already described. At the decoder, as illustrated by FIG. 6, the decoding method 600 can include some inverse operations (compared to the operations of the encoder side). For instance, the decoding method 600 can include parsing/entropy decoding 610 of the input bins to extract the quantized form of the parameters. Inverse quantization 620 can then applied to derive the final values of the parameters. The matrix decomposition/sparsification of the tensors at the encoder usually does not require an inverse process at the decoder. For instance, the parameters that were set to zero at the reduction of parameters stage (reducing 520) can remain zero after inverse quantization at the decoder.

As illustrated by FIG. 6, the output of parsing and decoding 610 a bitstream corresponding to a layer of the DNN can comprise metadata and quantized parameters. For instance, when a codebook-based quantization has been performed at the encoder side, the output includes the codebook and the corresponding indices. For instance, both the codebook and the tensor of indices can be computed by the method of the K-means, which will derive a codebook of K values denoting the cluster centers and a tensor of indices that can have values belonging to the integer range [0 . . . K-1].

The decoding method can further comprise performing inverse quantization 620, using the decoded information (like the indices and the codebook).

When several layers can be decoded by the decoding method 600, the method 600 can be performed iteratively layer per layer, until (650) parameters of the last layer are encoded.

As illustrated by FIG. 5, at least some of the elements output by the quantization 530 are used as input for performing entropy coding 540, the way the quantization is implemented should be compliant with the way the entropy coding is performed, or vice-versa. This should be the case for instance, whether the quantization is a uniform quantization or a codebook-based quantization (as quantization used in some compression solutions, like in the current upcoming standard MPEG-NNR)

However, this is not always the case. For instance, codebook-based quantization can present some disadvantages, when coupled with some solutions commonly used in the entropy coding like the Context-based Adaptive Binary Adaptive Coding (CABAC), as in some MPEG NNR draft standard.

At least some embodiments of the present disclosure invention help address this issue. It is to be pointed out that the embodiments of the methods of the present disclosure detailed herein can be implemented in many compression solutions and are not limited to a specific standard, even at least some of the embodiments can for instance apply in the context of some compression standards, like some draft standard developed by ISO/MPEG7.

Some embodiments of the present disclosure can comprise transmitting/receiving signaling information between an encoder and a decoder. This signaling information is presented in the present disclosure in link with an exemplary, non-limitative, syntax. This exemplary syntax is based, for the ease of explanation, on a syntax used in an exemplary MPEG NNR draft standard, the differences with the MPEG NRR syntax being underlined in the syntax tables.

For a better understanding of the present disclosure, some aspects of the MPEG NNR draft standard, of codebook-based quantization and of CABAC algorithm are briefly presented hereinafter.

MPEG NNR Draft Standard

The exemplary MPEG NNR draft standard includes a quantization method based on a codebook and indices. The Layer Decoding Process and the Quantized weight tensor decoding Process and the corresponding syntax of the exemplary MPEG NNR draft standard are introduced below.

According to this exemplary solution, a Layer Decoding process receives as inputs:

- A variable "tensorDimensions" which is a list of integer values specifying the dimensions of the weight tensor
- An integer variable "maxNumNoRem" for CABAC binarization
- Two optional variables "codebook_zero_offset" which is an integer and "codebook" which is a list of float32 values of size "codebook_size"

The layer decoding process outputs a weight tensor "RecWeights" with 32-bit floating-point values.

When the variable "codebook" or the variable "codebook_zero_offset" is not present, a syntax unit "step_size( )" is decoded from the bitstream.

The arithmetic coding engine and context models are initialized as specified in subclause in the exemplary draft standard. A syntax unit layer (tensorDimensions, maxNumNoRem) is decoded from the bitstream.

If variable "codebook" or "codebook_zero_offset" is not present, "recWeights" is set as follows:

```
  RecWeights = QuantWeights * step_size
Else:
  dim = Size( dimensions )
  for( i = TensorIterator( dim ); !TensorIteratorEnd( i,);
    i = TensorIteratorNext( i, dimensions ) {
    RecWeights[i] = codebook[ QuantWeights[ i ] + codebook_zero_offset ]
  }
```

According to the exemplary MPEG NNR solution, inputs to the Quantized weight tensor decoding Process are:

A variable "tensorDimensions" which is a list of integer values specifying the dimensions of the weight tensor An integer variable "maxNumNoRem"

The Quantized weight tensor decoding process outputs the signed integer weight tensor "QuantWeight".

A syntax unit "quant_weight_tensor (tensorDimensions, maxNumNoRem)" is decoded from the bitstream yielding QuantWeight.

More precisely, the following syntax is used for Layer:

TABLE 1

| Syntax | Type/ Subclause |
|---|---|
| layer( dimensions, maxNumNoRem ) { | |
| weight_tensor( dimensions, maxNumNoRem ) | 0 |
| end_of_quant_layer_one_bit | ae(t) |
| while( !byte_aligned( ) ) | |
| nesting_zero_bit | f(1) |
| } | |

where end_of_quant_layer_one_bit specifies a terminating bit equal to 1.

nesting_zero_bit is one bit set to 0.

The following syntax is used for Step size:

TABLE 2

| Syntax | Type/Subclause |
|---|---|
| step_size( ) { | |
| step_size | flt(32) |
| } | |

where step_size is the quantization step size.

The following syntax is used for Quantized weight tensor:

TABLE 3

| Syntax | Type/Subclause |
|---|---|
| quant_weight_tensor( dimensions, maxNumNoRem ) { | |
| dim = Size( dimensions ) | |
| for( i = TensorIterator( dim ); | |
| !TensorIteratorEnd( i, dimensions ); | |
| i = TensorIteratorNext( i, dimensions ) { | |
| quant_weight( i, maxNumNoRem ) | 0 |
| } | |
| } | |

The following syntax is used for Quantized weight:

TABLE 4

| Syntax | Type/ Subclause |
|---|---|
| quant_weight( i, maxNumNoRem ) { | |
| QuantWeight[i] = 0 | |
| sig_flag | ae(v) |
| if( sig_flag ) { | |
| QuantWeight[i]++ | |
| sign_flag | ae(v) |
| j = −1 | |
| do { | |
| j++ | |
| abs_level_greater_x[j] | ae(v) |
| QuantWeight[i] += abs_level_greater_x[j] | |
| } while( abs_level_greater_x[j] == 1 && j < maxNumNoRem ) | |

TABLE 4-continued

| Syntax | Type/ Subclause |
|---|---|
| if( j == maxNumNoRem ) { | |
| RemBits = 0 | |
| j = −1 | |
| do { | |
| j++ | |
| abs_level_greater_x2[j] | ae(v) |
| if( abs_level_greater_x2[j] ) { | |
| RemBits++ | |
| QuantWeight[i] += 1 << RemBits | |
| } | |
| } while( abs_level_greater_x2[j] ) | |
| abs_remainder | uab (RemBits) |
| QuantWeight[i] += abs_remainder | |
| } | |
| QuantWeight[i] = sign_flag ? -QuantWeight[i] : QuantWeight[i] | |
| } | |
| } | |

where sig_flag specifies whether the quantized weight QuantWeight[i] is nonzero. A sig_flag equal to 0 indicates that QuantWeight[i] is zero.

sign_flag specifies whether the quantized weight QuantWeight[i] is positive or negative. A sign_flag equal to 1 indicates that QuantWeight[i] is negative.

abs_level_greater_x[j] indicates whether the absolute level of QuantWeight[i] is greater j+1.

abs_level_greater_x2[j] comprises the unary part of the exponential golomb remainder.

abs_remainder indicates a fixed length remainder.

Codebook-Based Quantization

Codebook-based quantization is described hereinafter in more details. When a Codebook-based quantization is used, the output of quantization (see quantization 530 of FIG. 5) can comprise following elements:

at least one codebook, and indices.

As explained above, a Codebook is a set of values (like floating-point values) that the parameters of a layer can have, after quantization. A codebook can be obtained by clustering for instance.

Indices (or in other words indexes) correspond to, or can be derived from, the codebook values assigned to the parameters of the original tensor by the quantizing. In some embodiment, a same codebook value can be assigned to each of the parameters of the same cluster (thus the set of quantized parameters can be seen as a tensor of a same shape than the original tensor).

In some exemplary embodiments, the K-Means algorithm can be used to quantize input parameters of the network. and represent the tensors of parameters as a codebook and tensors of indices. For instance, the values of a codebook can be the centers of clusters calculated by the K-Means Quantization algorithm.

K-Means is a simple algorithm for clustering n-dimensional vectors. The goal of the K-Means algorithm is to partition data that are similar into "k" well-separated clusters. In quantization context, the number k can be a power of 2. The group of clusters is referred to hereinafter as the "Codebook". Each entry in the codebook is a number specifying the "center" of that cluster. For example, for 5-bit quantization of numbers, the codebook has $2^5=32$ entries and each number can be represented by a 5-bit index value that corresponds to the codebook entry that is closest to this number.

In the context of neural network compression, one can quantize each tensor of parameters, separately as a single dataset of scalar numbers in 1-dimensional space.

So, if $W=\{w_1, \ldots w_n\}$ is the set of all weight values in a tensor, and $C=(C_1, \ldots, C_k)$ is the collection of k clusters partitioning the values in W, our goal is to minimize "Within-Cluster Sum of Squares (WCSS)":

$$C = \underset{c_1,\ldots,c_k}{\operatorname{argmin}} \sum_{i=1}^{k} \sum_{w \in C_i} |w - c_i|^2 \quad (1)$$

Where $c_i$ (lower case c) is the center of the i-th cluster $C_i$.

Therefore, the output of this exemplary quantization process is a codebook C and a list of m-bit index values (where $m=\log_2 k$); one for each number in the original tensor.

CABAC

Some exemplary compression solutions, and notably some draft of compression standard like some MPEG NNR draft standard, propose an entropy coding/decoding that uses a CABAC Binarization. For a better understanding of the presented disclosure, CABAC is briefly presented hereinafter. CABAC was first developed for video coding purpose. CABAC is used for instance for coding residuals in MPEG video codecs. Its arithmetic coding engine takes bins as input, i.e. 0 or 1, instead of integer values or float values. In the case were the information to be encoded is not a binary flag (like for tensor of indices associated with a codebook), a binarization operation can be performed to transform the input values into bins. Each bin is then encoded separately.

DeepCABAC, which is more adapted for instance to the compression of a Neural Network, can be used in some compression standards like the MPEG NNR draft standard. DeepCABAC uses a similar binarization as CABAC. This binarization corresponds to a combination of truncated unary code and fixed length remaining absolute value symbol.

Figure 4:
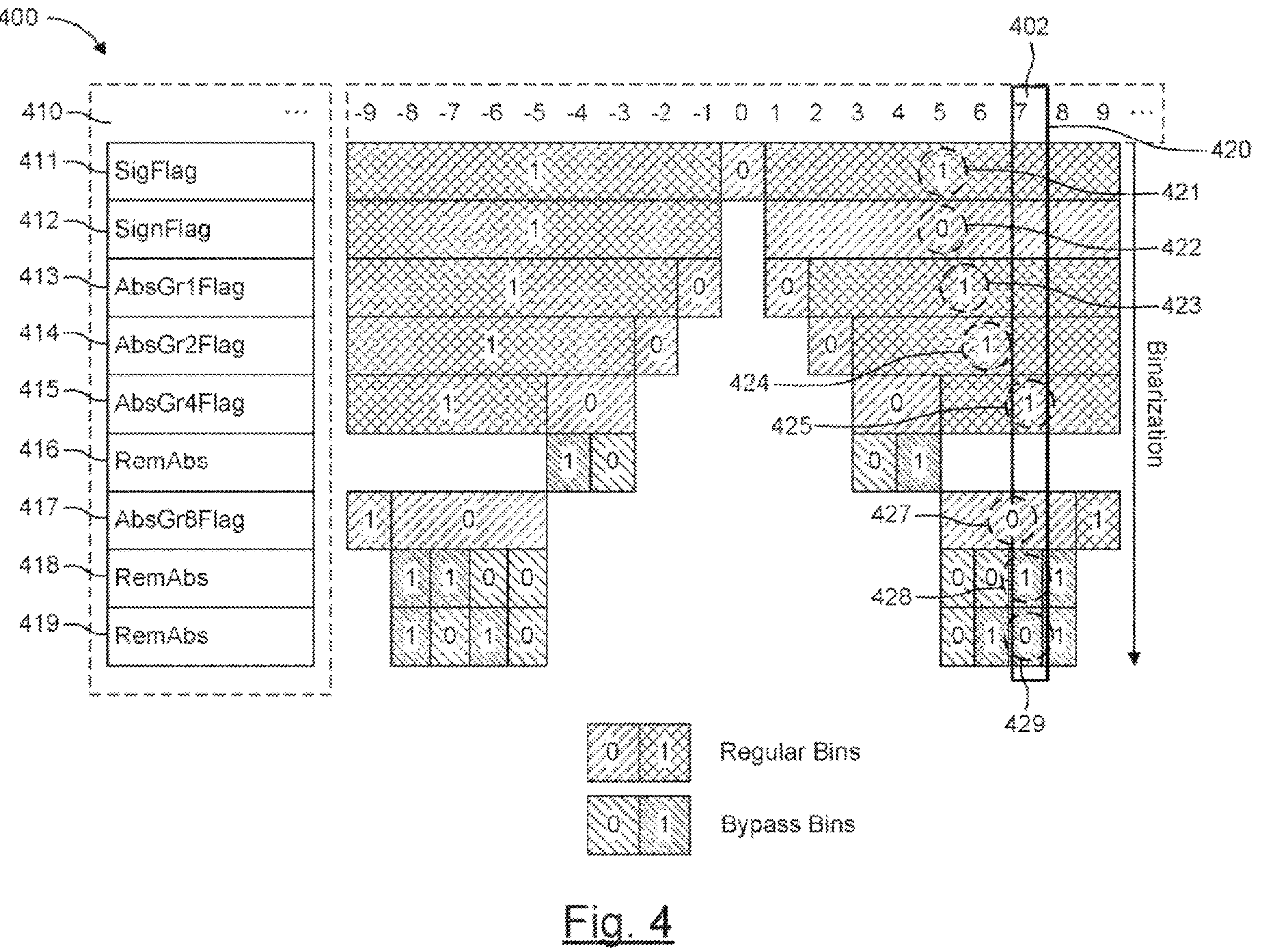
FIG. 4 shows a binarization module of DeepCABAC, that can be used under the general aspects described herein.

The binarization process 400 of DeepCABAC is illustrated in FIG. 4, as an example, for numbers 402 ranging from (−8) to 8.

The binarization process is based a set 410 of symbols (or flags), as the illustrated flags sigFlag 411, SignFlag 412, AbsGr1Flag 413, AbsGr2Flag 414, AbsGr4Flag 415, RemAbs 416, AbsGr8Flag 417 and the bypass bins 418 and 419.

The processing of a weight value results in a list (or sequence) 420 of bins corresponding to respective values (421 to 429) of at least some of the symbols (411 to 419).

The exemplary encoding of the number 7 is described hereinafter with more details.

The encoding of the number 7 is shown in FIG. 4 by an highlighted column (element 420). As shown by FIG. 4, the column 420 encoding number 7 corresponds to a list of bins (orbits) following the number 7 at the top and descending its column) computed as follow:

- Abs(7) is greater than 0, then the significance flag sigFlag 411 has the value "1" (element 421 of FIG. 4)
- 7 is positive, then the sign flag SignFlag 412 has the value "0" (element 422 of FIG. 4)
- 7 is greater than 4, then "greater than 1" flag AbsGr1Flag has the value "1" (element 423 of FIG. 4), "greater than 2" flag AbsGr2Flag 413 has the value "1" (element 424 of FIG. 4), and "greater than 4" flag AbsGr4Flag 414 has the value "1" (element 425 of FIG. 4)
- 7 is less than 8, then "greater than 8" flag AbsGr8Flag 415 has the value "0" (element 427 of FIG. 4)
- According to the exemplary use case of FIG. 4, 2 bypass bins 418, 419 are then coded with values "1" and "0" respectively (elements 428, 429 of FIG. 4).

(In the example of number 7, no value is assigned to some RemAbs flag 416)

Finally, the sequence to encode for the number "7" is "10111010". Adaptive coding is applied, i.e. at both encoder and decoder sides, an initial probability is assigned to each flag, before the encoding or decoding of the first of the flags for the first weight. The probability of each flag is then updated after encoding or decoding at least one of the flags. For instance, in case each flag is expected to be equiprobable (i.e. 50% chance to be 0 or 1), an initial probability of 0.5 can be assigned to each flag before encoding the first of the flags. The probability model can thus be updated each time the value for the corresponding flag of the next weight is encoded. Of course, other initial probabilities can be assigned to the flags.

Adaptive coding is applied, which means that an initial probability is set before encoding the first of each flags, usually expected to be equiprobable, i.e. 50% chances to be 0 or 1. The probability model is then updated each time the corresponding flag of the next weight is encoded.

In order to further take advantage of spatial correlations between neighboring parameters, contexts are assigned to the regular bins (using previously encoded parameters), whereas the remaining bins are coded using the low-complexity bypass coder. Thus, each bin is arithmetically coded based on the value of the neighboring weight's corresponding bin which has been coded just before. Two different probability models are selected depending on whether the current and the previous flag have the same value In the following, for simplicity purpose, the term CABAC is used to denote processing or algorithm including a binarization, which can be followed by an adaptive binary arithmetic coding, which DeepCABAC belongs to. It is to be pointed out however that the present disclosure is not limited to embodiments using CABAC and also apply to embodiments using We can generalize to coders that are optimal on a signal centered on the value zero (or on a value close to zero).

Probability models can be reinitialized for each layer of a DNN or kept from a current layer to the next layer. In video, probability models can be reinitialized at each frame or slice. Embodiments where the probability model is reinitialized at each layer (in case of DNN), or frame/slice for video, can be adapted to embodiments where several layers, respectively several frames and/or slices for video, can be decoded in parallel. Furthermore, the reinitialization of a probability model between layers or sub-layers (and/or frames and/or slices) can avoid a propagation of errors.

If the use of codebook and indices for quantization, as introduced above, can permit to obtain a more efficient compression, in term of coding cost for instance, a codebook design is sometimes not optimally aligned with some solutions that can be used in the entropy coding, like CABAC (or DeepCABAC), This is for instance the case in some MPEG NNR draft standards using codebook-based quantization and CABAC-based entropy coding. Indeed, the CABAC binarization is optimally designed to get as input small integer signed values, as a flag "sign_flag" is contextually coded for each parameter while, as explained above, the value output by a Codebook-based quantization does not always output such small integers value. For instance, values output by a Codebook-based quantization can be unsigned values Thus, an optimized compressing method is needed.

The present disclosure encompasses several aspects that can be implemented in combination, or separately (one without the other), depending upon embodiments, for helping to address at least some of the above issues.

At least some embodiments of the present disclosure propose to adapt the output of the quantization to the entropy coding that will use, as inputs, at least some of those outputs and/or to adapt the entropy coding to the outputs of the quantization.

More precisely, at least some embodiments of the present disclosure propose a compression method that helps align at least some kind of quantization with the entropy encoding to be performed, like the possibility of using a Codebook-based quantization when an algorithm including a binarization (that can be followed by an adaptive binary arithmetic coding), like CABAC or DeepCABAC, is used during the entropy coding (as in some MPEG NNR draft standard for instance). At least some embodiments of the present disclosure also propose at least one corresponding decoding (or decompression) method as well as signalization information to be transmitted between the encoder and the decoder. This signaling information is presented hereinafter by using an exemplary syntax, partially based on a syntax used for an MPEG NNR draft standard. Elements of the exemplary syntax presented herein that differ from the syntax of the MPEG NNR working draft are underlined to facilitate the reading of the present disclosure.

An exemplary syntax that can be used for the codebook and its activation, according to at least one exemplary embodiment of the present disclosure, is detailed herein after.

At least some embodiments of the compression/decompression methods of the present disclosure relate to a coding/decoding process of at least one tensor of a layer or sub-layer of at least one DNN, when the at least one layer can be represented as a codebook and indices, as well as an associated syntax structure.

According to a first aspect of the present disclosure, a flag (e.g. codebook_quantization_flag) can be added in the High-level syntax, to select between a use of a codebook-based quantization and a use of a uniform quantization. Depending upon embodiments, this flag (or in other word symbol,) can be included at different levels. For instance, in some embodiments, it can be included in one or more parameter set, such as the Model Parameter Set (MPS) and/or the Layer Parameter Set (LPS).

The incorporating of such a flag in a bitstream compatible with a standard allowing the use of different kinds of quantization can permit at a decoding stage to determine the kind of quantization used (at the encoding stage) for the bitstream being processed, in order for instance to adapt the decoding process accordingly.

For instance, in some compression solutions, like some MPEG NNR draft standard, that can permit several kinds of quantization, and a decoder select the kind of inverse quantization to apply based at least partially on such a flag.

FIGS. 8A and 8B illustrates an exemplary method for encoding, respectively decoding, data wherein a kind of quantization of signaled (801) by the encoder in a bitstream, so the decoder determines (802) a kind of inverse quantization for reconstructing the decoded data. For example, the data ca be video data or layers or sub-layers of a Neural Network.

According to a second aspect, when a Codebook-based quantization is used at the encoding stage, the codebook has to be associated to the encoded bitstream (for instance transmitted with the bitstream to the decoder). At least some embodiments of the present disclosure thus propose to transmit the codebook used for the quantization with the bitstream.

For instance, the following exemplary syntax can be implemented for signaling the codebook:

TABLE 5

| Syntax | Type/Subclause |
|---|---|
| codebook( ) { | |
| codebook size minus1 | ue(v) |
| for( i = 0; i <= codebook_size_minus1; i++) | |
| codebook[i] | flt(32) |
| } | |

where:

codebook_size_minus1+1 specifies the size of the quantization codebook codebook[i] specifies the weight value of the cluster center related to the i-th index.

In the above exemplary syntax, the codebook values are coded as floating-point values (Flt(32)), they could also be coded as integers or other types such as float 64 for instance.

It is to be pointed out that the flag for signaling the kind of quantization introduced above can be optional when in some compression solutions only codebook-based quantization is allowed.

Further aspects of the present disclosure, adapted to embodiments where a codebook-based quantization is allowed, propose a compression method comprising modifying the codebook and/or indices used during quantization and/or entropy coding (for instance when quantizing parameters of an original tensor of a layer of a DNN).

More precisely, according to some embodiments of the present disclosure; upon the construction of the codebook, the number of parameters corresponding to each cluster can be known and the order in which the codebook values are sorted can be chosen so as, for instance, to lower the coding cost of the encoded parameter indices, which depends on the entropy coder used. An exemplary embodiment, adapted for instance to a compression of a layer of a DNN, and including an entropy coding stage at least partially based on DeepCABAC, is presented in more details hereinafter.

The DeepCABAC (used for instance in some MPEG NNR draft standard), includes the arithmetic coding engine that was developed for the arithmetic coding of transform residuals and syntax elements in the domain of video compression. To adapt to the compression of Neural Network, the binarization stage has been redesigned to fit the parameter values to encode. Tensors of parameters of DNNs, for a large majority of models, are usually centered on a value close to zero, which is the starting point of the binarization for DeepCABAC as described above in link with FIG. 4.

Figure 7:
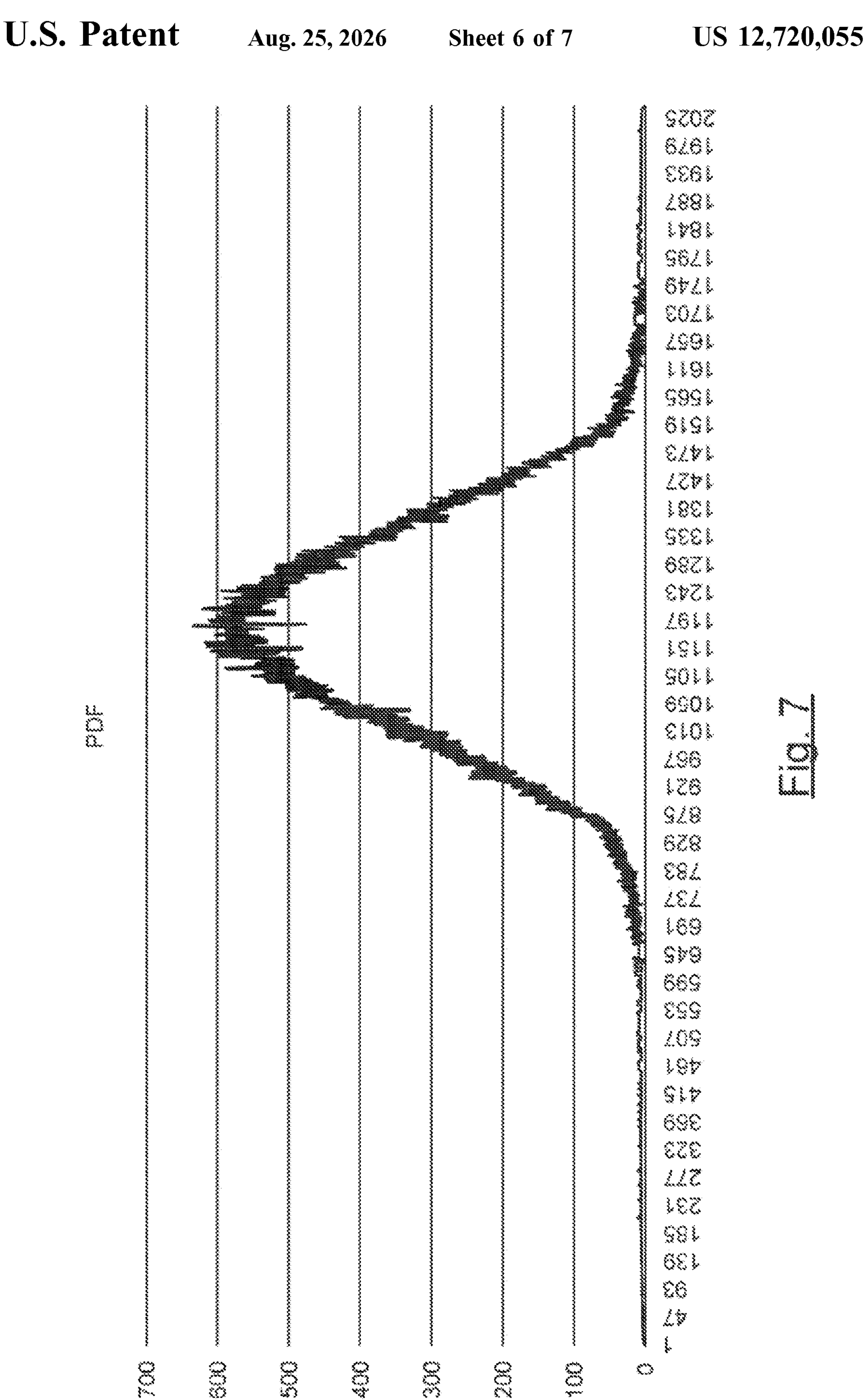
FIG. 7 illustrates a Probability Distribution Function (PDF) of parameter values for a fully connected layer of a neural network in an exemplary embodiment of the present disclosure. It is to be noted that the drawings illustrate example embodiments and that the embodiments of the present disclosure are not limited to the illustrated embodiments.

FIG. 7 shows the repartition of the values of an exemplary, typical, tensor of parameters, for an exemplary fully connected layer of an exemplary neural network, when represented using a 2048-bin histogram.

Each value in abscissa represents a cluster index, which is associated to a parameter value, when the original range of values is uniformly quantized into 2048 bins. The graphic then shows how many parameters have a value that is closest to each index.

The Probability Density Function (PDF) of parameter values of a layer of a DNN often looks like the one in FIG. 7, that is a pseudo Gaussian which is centered at the value zero, i.e. index being approximatively 1180 here corresponds to a value close to zero.

In the case of uniform quantization, as currently included in some compression standard like some MPEG NNR draft standard, the quantized parameters are represented by an integer (signed) value, which is derived by multiplying each original value by a given step size. In the above example, the center of the Gaussian being very close to zero, it's quantized value is likely to be zero.

In the case of a codebook-based quantization, the indices—here from 0 to 2047 replace the values and an additional codebook containing the value of each cluster center is transmitted. Then, at the decoding, each parameter is derived by mapping its index to the corresponding codebook value. As the index values consist of unsigned integer values, a sign flag signaling the sign of data, like the CABAC "sign flag", will always take the value 0 (positive). Thus, a third aspect of the present disclosure proposes to adapt CABAC by omitting or removing the sign flag.

Furthermore, when a codebook-based quantization is used, together with CABAC, the binarization is no more adapted since we now encode index values and the center of the Gaussian now corresponds to the value 1180 in the example illustrated by FIG. 7 and not the value zero. Thus, a fourth aspect of the present disclosure proposes to cope with this issue, by modifying the coded index values and/or reordering the codebook so that the coded index values are signed and centered at zero to favor values coded using regular CABAC bins.

Removing Sign Flag of CABAC

As explained above, according to at least some embodiments of the present disclosure adapted notably to cases where codebook quantization is activated, the entropy coding can be based on a binarization different from the CABAC one as presented above with link with FIG. 4. For instance, in some embodiments, the binarization can be similar to the CABAC Binarization, but with the "sign flag" of CABAC being omitted, or the binarization based on CABAC (as presented above in link with FIG. 4) but with an additional step of removing the "sign-flag" from the output of the CABAC.

In such embodiments, the construction of codebook and tensor of indices are kept unchanged, for instance with the codebook being sorted decreasingly (the number of parameters per cluster decreasing with increasing index value).

More precisely, according to some embodiments of the present disclosure, the encoding method can comprise adapting the signaling information used for deriving the parameters in the corresponding part of the bitstream, the "sign flag" being omitted. The information signaling the sign of data can be kept in the bitstream for other kinds of quantization, like uniform quantization for instance. Thus, the corresponding decoding (using or not the sign flag notably) can differ, depending upon the kind of quantization performed at the encoder. For instance, in some embodiments, the inverse quantization can differ according to the kind of quantizing indicated in the signaling information.

A signaling information regarding the kind of quantization performed (like the activation of codebook-based quantization) can be added as a parameter to enable the proper parameter construction after the inverse quantization.

A first exemplary syntax is provided hereinafter for decoding the parameters when Codebook-based quantization is activated.

Such an exemplary syntax can be used for instance in embodiments adapted to be implemented in a codec/decoder only using codebook-based quantization/inverse quantization, or in embodiments where different quantization methods can be used but where the following table is used only when codebook quantization is activated for a layer/a DNN (another table being used when uniform quant is activated for a layer) (thanks to conditional call for instance)

TABLE 6

| Syntax | Type/ Subclause |
|---|---|
| codebook quant weiqht ( i, maxNumNoRem ) { | |
| QuantWeight[i] = 0 | |
| sig_flag | ae(v) |
| if( sig_flag ) { | |
| QuantWeight[i]++ | |
| ~~sign_flag~~ | ~~ae(v)~~ |
| j = −1 | |
| do { | |
| j++ | |
| abs_level_greater_x[j] | ae(v) |
| QuantWeight[i] += abs_level_greater_x[j] | |
| } while( abs_level_greater_x[j] == 1 && j < maxNumNoRem ) | |
| if( j == maxNumNoRem ) { | |
| RemBits = 0 | |
| j = −1 | |
| do { | |
| j++ | |
| abs_level_greater_x2[j] | ae(v) |
| if( abs_level_greater_x2[j] ) { | |
| RemBits++ | |
| QuantWeight[i] += 1 << RemBits | |
| } | |
| } while( abs_level_greater_x2[j] ) | |
| abs_remainder | uab (RemBits) |
| QuantWeight[i] += abs_remainder | |
| } | |
| ~~QuantWeight[i] = sign_flag ? −QuantWeight[i] : QuantWeight[i]~~ | |
| } | |
| } | |

where:

sig_flag specifies whether the quantized weight QuantWeight[i] is nonzero. A sig_flag equal to 0 indicates that QuantWeight[i] is zero.

sign_flag specifies whether the quantized weight QuantWeight[i] is positive or negative. A sign_flag equal to 1 indicates that QuantWeight[i] is negative.

abs_level_greater_x[j] indicates whether the absolute level of QuantWeight[i] is greater j+1.

abs_level_greater_x2[j] comprises the unary part of the exponential

A second exemplary syntax is provided herein after for a compression method based on a quantized weight syntax including both codebook-based quantization and uniform quantization

TABLE 7

| Syntax | Type/ Subclause |
|---|---|
| quant_weight ( i, maxNumNoRem, isCodebookQuant ) { | |
| QuantWeight[i] = 0 | |
| sig_flag | ae(v) |

TABLE 7-continued

| Syntax | Type/ Subclause |
|---|---|
| if( sig_flag ) { | |
| QuantWeight[i]++ | |
| if( !isCodebookQuant ) | |
| sign_flag | ae(v) |
| j = −1 | |
| do { | |
| j++ | |
| abs_level_greater_x[j] | ae(v) |
| QuantWeight[i] += abs_level_greater_x[j] | |
| } while( abs_level_greater_x[j] == 1 && j < maxNumNoRem ) | |
| if( j == maxNumNoRem ) { | |
| RemBits = 0 | |
| j = −1 | |
| do { | |
| j++ | |
| abs_level_greater_x2[j] | ae(v) |
| if( abs_level_greater_x2[j] ) { | |
| RemBits++ | |
| QuantWeight[i] += 1 << RemBits | |
| } | |
| } while( abs_level_greater_x2[j] ) | |
| abs_remainder | uab (RemBits) |
| QuantWeight[i] += abs_remainder | |
| } | |
| if( !isCodebookQuant ) | |
| QuantWeight[i] = sign_flag ? -QuantWeight[i] : QuantWeight[i] | |
| } | |
| } | |

where sig_flag specifies whether the quantized weight QuantWeight[i] is nonzero. A sig_flag equal to 0 indicates that QuantWeight[i] is zero.

sign_flag specifies whether the quantized weight QuantWeight[i] is positive or negative. A sign_flag equal to 1 indicates that QuantWeight[i] is negative.

abs_level_greater_x[j] indicates whether the absolute level of QuantWeight[i] is greater j+1.

abs_level_greater_x2[j] comprises the unary part of the exponential

Modifying Indices and/or Reordering of the Codebook

Some compression solutions use an offset when encoding the codebook in the bitstream, in order to encode signed index values. For instance, in some compression solutions an offset can be signaled in the bitstream, as by the external variable codebook_zero_offset in the below syntax). At the decoder, the encoded values are then mapped back to a positive index, according to the offset, so that the inverse quantization step uses the codebook array properly as per below:

Exemplary Syntax for Offset:

For instance, if variable codebook or codebook_zero_offset is not present, recWeights is set as follows:

```
RecWeights = QuantWeights * step_size
Else:
  dim = Size( dimensions )
  for( i = TensorIterator( dim ); !TensorIteratorEnd( i,);
    i = TensorIteratorNext( i, dimensions ) {
    RecWeights[i] = codebook[ QuantWeights[ i ] + codebook_zero_offset ]
  }
```

At the difference to the above solutions, according at least some embodiments of the present disclosure, the centering of the indexing can be done around codebook_size/2, where codebook-size denotes the number of elements in the codebook and codebook_size/2 denotes the number of elements divided per 2. Such a centering can permit to avoid transmitting an additional offset, further to the codebook.

For example, in an exemplary embodiment, if the codebook size is 8, centering the indexing around 4 gives the following coded index values, compared to the "original" index used by some compression solutions:

TABLE 8

| Original index | 0 | 1 | 2 | 3 | 4 | 5 | 6 | 7 |
|---|---|---|---|---|---|---|---|---|
| Coded index values | −4 | −3 | −2 | −1 | 0 | 1 | 2 | 3 |

In the exemplary embodiment of Tables 8; the coded indices are signed integer values distributed around 0, the value 0 being used for coding the original value index 4. Of course, the present disclosure encompasses other distributions of signed integer values for the coded indices including at least one negative integer and at least one positive integer. In some embodiments, indices with values lower that codebook-size/2 can be coded as negative integer, indices with values higher that codebook-size/2 being coded as positive integers. In some embodiments, indices with values higher that codebook-size/2 can be coded as negative integer, indices with values lower that codebook-size/2 being coded as positive integers. In some embodiments, embodiments, increasing successive values of indices can be coded alternatively as a positive integer and a negative integer.

For instance, two successive values of indices (when sorted increasingly or decreasingly) can be coded as positive integer and negative integer (or vice versa) having the same absolute value "av", the integer following value(s) being coded with a positive and negative integer (or vice-versa) having an absolute value being the integer immediately greater or lower the absolute value "av". Of course, depending upon embodiments, difference between successive absolute values can vary.

In some embodiments, in order to improve (even optimize) the encoding of CABAC and use the probability distribution, the codebook can be sorted decreasingly, so that the cluster with the most parameters can be mapped to the encoded index value 0.

For instance, table "Table 9" below shows a codebook construction where the codebook is ordered decreasingly according to the size of corresponding parameter clusters (thus the codebook maps bigger clusters with lower index values)

TABLE 9

| Original index | 0 | 1 | 2 | 3 | 4 | 5 | 6 | 7 |
|---|---|---|---|---|---|---|---|---|
| Parameters count | 5000 | 2000 | 800 | 500 | 100 | 50 | 20 | 8 |

According to at least some embodiments of the present disclosure, the following mapping function f(i), given in equation (1), can be applied from the original index values of the codebook to obtain the corresponding values that will be coded in the bitstream. Those corresponding values are called hereinafter "coded index values"

$$f(i) = (-1)^{i+1}\,\text{floor}\left(\frac{i+1}{2}\right) \qquad \text{Equation (1)}$$

where i denotes the original index value and floor(x) is the largest integer less than or equal to x.

The applying of the mapping function can help to obtain clusters being evenly (or almost evenly) distributed around the coded index value zero. For the above example, the following table Table 10 shows the coded indices:

TABLE 10

| Original index | 0 | 1 | 2 | 3 | 4 | 5 | 6 | 7 |
|---|---|---|---|---|---|---|---|---|
| Coded index values | 0 | 1 | −1 | 2 | −2 | 3 | −3 | 4 |

Mapping and inverse mapping processes can be used in an encoder and decoder to achieve improved coding performance without modifying the codebook order.

The coding of the codebook array (or in other words the mapping function used for coding the indexes of the codebook) can differ upon embodiments, as detailed hereinafter in some exemplary embodiments.

In some embodiments, the codebook array can be encoded in decreasing order (same order as the "original" one when referring to the Table 8). Thus, the first value of the codebook denotes the cluster center of the largest cluster in terms of number of parameters and the codebook is ordered such as the cluster sizes decrease with increasing index.

The mapping function f(i) introduced above by (Equation 1) can then be used to derive the coded indices.

In that case, for decoding the original index values, the inverse function of m(i) is needed:

$$f^{-1}(i) = 2.i.\text{sign}(i) - \text{floor}\left(\frac{\text{sign}(i)+1}{2}\right) \qquad \text{Equation (2)}$$

Finally, at the decoder, the following syntax can be used:

If variable codebook or codebook_zero_offset is not present, recWeights is set as follows:

```
  RecWeights = QuantWeights * step_size
Else:
  dim = Size( dimensions )
  for( i = TensorIterator( dim ); !TensorIteratorEnd( i,);
    i = TensorIteratorNext( i, dimensions ) {
    sign = QuantWeights[i] < 0 ? −1 : 1
  RecWeights[i] = codebook[ (QuantWeights[i] * sign) << 1 − Floor((sign + 1) >> 1)]
```

Reorder Codebook Before Transmission

In some exemplary embodiments, the following mapping function can be used to reorder indices:

$$f(i) = (-1)^{i+1}\,\text{floor}\left(\frac{i+1}{2}\right) \qquad \text{Equation (2)}$$

The corresponding codebook values in the codebook array can further be reordered together with their corresponding indices.

Finally, at the decoder, the following syntax can be implemented:

If variable codebook or codebook_zero_offset is not present, recWeights is set as follows:

```
  RecWeights = QuantWeights * step_size
Else:
  dim = Size( dimensions)
  codebook_size = Size(codebook)
  for( i = TensorIterator( dim ); !TensorIteratorEnd( i,);
    i = TensorIteratorNext( i, dimensions ) {
    RecWeights[i] = codebook[ QuantWeights[ i ] + codebook_size>>1 ]
}
```

Note that a same codebook can be used for several tensors of several layers. In that case, K-means can, for instance, be performed on a super tensor, resulting of the concatenation of at least one tensor of at least one layer.

Experimental Results

Some experimental results are detailed below for some exemplary embodiments using the exemplary mapping functions introduced above as (Equation 1) and (Equation 2), when tested on the model MobileNETV2.

Both embodiments provide identical results in terms of number of bits necessary to code the codebook and the tensor of indices. More precisely, preliminary results show the following gains for the coding of the model Mobile- NetV2 using a codebook-based quantization and the unmodified binarization of CABAC:

When the codebook order is unmodified and the tensors of positive indices are fed to CABAC, as in some compression solutions, 2,334,525 bytes are required to code for the model.

When the above mapping function is used to derive signed indices and to utilize the binarization of CABAC to optimize the use of regular bins, 2,313,370 bytes are necessary. This represents a 0.9% bitrate gain reduction, with a very low additional complexity.

In the above exemplary embodiment using (Equation 1), the codebook is transmitted in the same order, only the tensors of indices are changed. This requires the decoder to perform the inverse mapping function to retrieve the cluster center values from the indices, which adds some minor computations at the decoder.

In the above exemplary embodiment using (Equation 2), almost no additional complexity is added at the decoder since only an addition is required to map the signed decoded indices to the proper location in the codebook array.

The tested exemplary embodiments can thus lead to better results than some known solutions based According to an example of the present principles, illustrated in FIG. 9, in a transmission context between two remote devices A and B over a communication network NET, the device A comprises a processor in relation with memory RAM and ROM which are configured to implement a method for compressing data, for instance data representative of a Deep Neural Network, as described in relation with the FIG. 1-8A-B and the device B comprises a processor in relation with memory RAM and ROM which are configured to implement a method for decompressing the data as described in relation with FIG. 1-8A-B.

In accordance with an example, the network is a broadcast network, adapted to broadcast/transmit the compressed data from device A to decoding devices including the device B.

A signal, intended to be transmitted by the device A, carries at least one bitstream comprising compressed data. According to an embodiment, the compressed data is representative of weights of one or more layers of a Deep Neural Network. According to another embodiment, the compressed data is representative of video data.

FIG. 10 shows an example of the syntax of such a signal transmitted over a packet-based transmission protocol. Each transmitted packet P comprises a header H and a payload PAYLOAD. According to embodiments, the payload PAYLOAD may comprise at least one information representative of a kind of quantization used for compressing the data encoded in the signal.

According to some embodiments, the payload PAYLOAD may comprise information representative of a codebook used for quantizing the data.

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
FIG. 2 shows a generic, standard decoding scheme.
Figure 2:
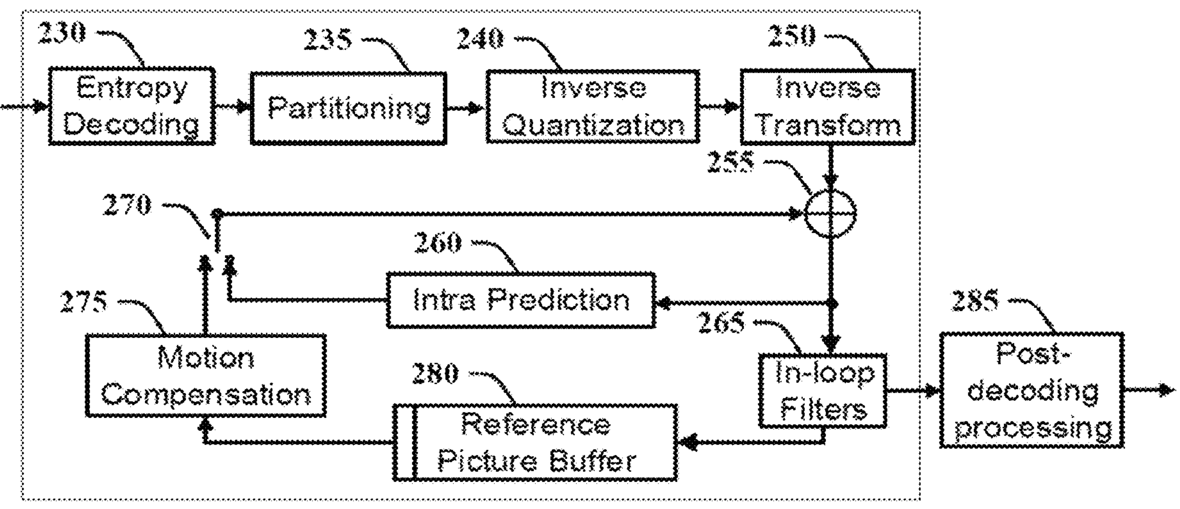
Figure 3:
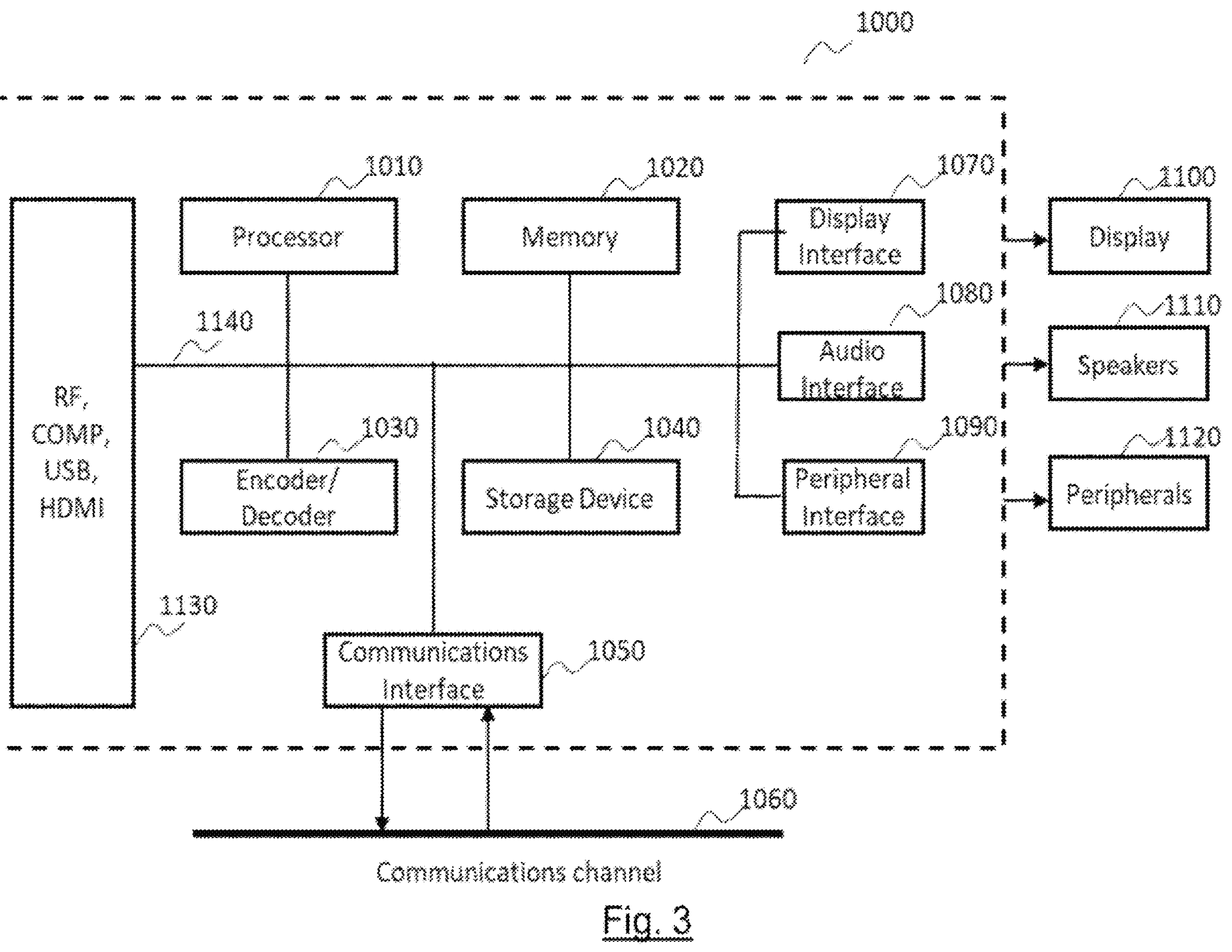
FIG. 3 shows a typical processor arrangement in which the described embodiments may be implemented.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to encoding and decoding (for instance, video encoding and decoding, and/or encoding and decoding of at least some weights of at least some layer of a DNN), and at least one other aspect generally relates to transmitting a bitstream generated or encoded. These and other aspects can be implemented as a method, an apparatus, a computer readable storage medium having stored thereon instructions for encoding or decoding data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods and other aspects described in this application can be used to modify modules, for example, the intra prediction, entropy coding, and/or decoding modules (160, 360, 145, 330), of an encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC).

Moreover, the present aspects are not limited to VVC or HEVC, or even to video data, and can be applied to an encoder or decoder adapted to encode, respectively decode, at least one layer of a neural network that can be used in many technical fields other than video (of course, in such embodiments, some modules like intra prediction module 160 can be optional)

Unless indicated otherwise, or technically precluded, the aspects described in this application can be used individually or in combination.

Various numeric values are used in the present application (for example modes used for reshaping). The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the sequence may go through pre-encoding processing (101), for example, applying a color transform to the input color picture (e.g., conversion from RGB 4:4:4 to YCbCr 4:2:0) in case of a video sequence, or performing a remapping of the input picture components in order to get a signal distribution more resilient to compression (for instance using a histogram equalization of one of the color components). Also, pre-encoding processing can include binarization as the exemplary binarization detailed above in link with CABAC.

Metadata can be associated with the pre-processing and attached to the bitstream.

In the encoder 100, in case of a video sequence, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130).

The quantized transform coefficients, as well as motion vectors and other syntax elements, are entropy coded (145) to output a bitstream.

The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. For instance, in case of a video sequence, combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a decoder 200. In the decoder 200, a bitstream is decoded by the decoder elements as described below. Decoder 200 generally performs a decoding pass almost reciprocal, to the encoding pass as described in FIG. 1. The encoder 100 also generally performs decoding as part of encoding data.

In particular, the input of the decoder 200 includes a bitstream, which can be generated by encoder 100. The bitstream is first entropy decoded (230) to obtain transform coefficients, motion vectors, and other coded information.

In case of a video bitstream, the picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded element (like the picture or the layer weights) can further go through post-decoding processing (285), for example, in case of a decoded image, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded or decoded data stream (such a video stream and/or a stream representative of at least one weight of at least one layer of at least one DNN), and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, data representative of at least one weight of at least one layer of the at least one DNN, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the data stream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV. Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals at least one of a plurality of transforms, coding modes or flags. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

- A process or device to perform encoding and decoding with deep neural network compression of a pre-trained deep neural network.
- A process or device to perform encoding and decoding of at least one layer of a pre-trained deep neural network, to implement deep neural network compression.
- A process or device to perform encoding and decoding with inserted information in a bitstream representative of parameters to implement deep neural network compression of a pre-trained deep neural network comprising one or more layers.
- A process or device to perform encoding and decoding with inserted information in a bitstream representative of parameters to implement deep neural network compression of a deep neural network.
- A bitstream or signal that includes one or more of the described syntax elements, or variations thereof.
- A bitstream or signal that includes syntax conveying information generated according to any of the embodiments described.
- Creating and/or transmitting and/or receiving and/or decoding according to any of the embodiments described.
- A method, process, apparatus, medium storing instructions, medium storing data, or signal according to any of the embodiments described.
- Inserting in the signaling syntax elements that enable the decoder to determine coding mode in a manner corresponding to that used by an encoder.
- Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method for decoding a bitstream comprising compressed video data, the method comprising:

receiving the bitstream comprising a flag, wherein the flag is configured to indicate codebook-based quantization or uniform quantization, and wherein the bitstream comprises a tensor of a neural network; and if the flag indicates a first value, determining that the flag indicates that codebook-based quantization was used to encode the bitstream, receiving an indication of a codebook size, and decoding the tensor from the bitstream using inverse quantization in accordance with the codebook size; or if the flag indicates a second value, determining that the flag indicates that uniform quantization was used to encode the bitstream and decoding the tensor from the bitstream using uniform quantization.

2. The method of claim 1, wherein the flag is signaled at a Model Parameter Set (MPS) or a Layer Parameter Set (LPS) level of the bitstream.

3. The method of claim 1, wherein the flag is a codebook_quantization_flag.

4. The method of claim 1, wherein a Context-based Adaptive Binary Adaptive Coding (CABAC) decoder is initialized using the inverse quantization to decode the bitstream based on the determination that the flag indicates that codebook-based quantization was used to encode the bitstream.

5. The method of claim 1, further comprising:

determining a codebook and the tensor for decoding the bitstream;

assigning a value to each location in the tensor based on the codebook; and inversely quantizing the tensor.

6. The method of claim 1, further comprising initializing a Context-based Adaptive Binary Adaptive Coding (CABAC) decoder with the codebook size.

7. A decoder for decoding a bitstream comprising compressed video data, the decoder comprising:

a processor and memory configured to:

receive the bitstream comprising a flag, wherein the flag is configured to indicate codebook-based quantization or uniform quantization, and wherein the bitstream comprises a tensor of a neural network;

if the flag indicates a first value, determine that the flag indicates that codebook-based quantization was used to encode the bitstream, receive an indication of a codebook size, and decode the tensor from the bitstream using inverse quantization in accordance with the codebook size; and if the flag indicates a second value, determine that the flag indicates that uniform quantization was used to decode the bitstream and decode the tensor from the bitstream using uniform quantization.

8. The decoder of claim 7, wherein the flag is signaled at a Model Parameter Set (MPS) or a Layer Parameter Set (LPS) level of the bitstream.

9. The decoder of claim 7, wherein the flag is a codebook_quantization_flag.

10. The decoder of claim 7, wherein the decoder is a Context-based Adaptive Binary Adaptive Coding (CABAC) decoder, and wherein the processor and memory are configured to be initialized to decode the bitstream based on the determination that the flag indicates that codebook-based quantization was used to encode the bitstream.

11. The decoder of claim 7, wherein the processor and memory are further configured to:

determine a codebook and the tensor for decoding the bitstream;

assign a value to each location in the tensor based on the codebook; and inversely quantize the tensor.

12. The decoder of claim 7, wherein the decoder is a Context-based Adaptive Binary Adaptive Coding (CABAC) decoder, and wherein the processor and memory are further configured to initialize the decoder with the codebook size.

13. A method for encoding a bitstream, the method comprising:

receiving video data, the video data comprising a tensor of a neural network;

encoding the video data according to a Context-based Adaptive Binary Adaptive Coding (CABAC) method to generate the bitstream, wherein the bitstream comprises a flag, wherein the flag is configured to indicate codebook-based quantization or uniform quantization to encode the bitstream;

wherein encoding the video data according the CABAC method comprises encoding the video data using codebook-based quantization in accordance with a codebook size if the flag indicates a first value or wherein encoding the video data according the CABAC method comprises encoding the video data using uniform quantization if the flag indicates a second value; and transmitting the encoded bitstream.

14. The method of claim 13, wherein the flag indicates the codebook size if the flag indicates the first value.

15. The method of claim 1, wherein the indication of the codebook size comprises a zero offset parameter.

16. The method of claim 1, wherein method comprises:

receiving an indication of a tensor size if the flag indicates the first value, and decoding the tensor from the bitstream using inverse quantization in accordance with the tensor size.

17. The decoder of claim 7, wherein the indication of the codebook size comprises a zero offset parameter.

18. The decoder of claim 7, wherein the processor is configured to:

receive an indication of a tensor size if the flag indicates the first value, and decode the tensor from the bitstream using inverse quantization in accordance with the tensor size.

19. The method of claim 13, wherein encoding the video data according to the CABAC method comprises encoding the video data using code-book quantization in accordance with a zero offset parameter.

20. The method of claim 13, wherein encoding the video data according to the CABAC method comprises encoding the video data using code-book quantization in accordance with a tensor size.

* * * * *